United States Patent [19]
Lang

[11] 3,819,104
[45] June 25, 1974

[54] APPARATUS FOR COMPRESSION AND COLDWELDING OF STRIPPED ENDS OF MULTI-CONDUCTOR CABLE

[75] Inventor: Donald D. Lang, Garden Grove, Calif.

[73] Assignee: Spectra-Strip Corporation, Garden Grove, Calif.

[22] Filed: Jan. 24, 1973

[21] Appl. No.: 326,286

[52] U.S. Cl. ............. 228/3, 29/203 MW, 29/470.1, 228/4, 228/5, 228/13
[51] Int. Cl. ............................................. B23k 21/00
[58] Field of Search ................... 228/3, 4, 5, 13, 44; 29/200 B, 203 MW, 203 S, 33 M, 470.1; 81/9.5 A, 9.5 R

[56] References Cited
UNITED STATES PATENTS

| | | | |
|---|---|---|---|
| 2,891,430 | 6/1959 | Johnson | 228/3 |
| 3,383,959 | 5/1968 | Weglin | 81/9.5 A |
| 3,653,571 | 4/1972 | Roymus et al. | 228/3 |
| 3,665,574 | 5/1972 | Brown et al. | 29/203 MW |

*Primary Examiner*—J. Spencer Overholser
*Assistant Examiner*—Robert J. Craig
*Attorney, Agent, or Firm*—I. Morley Drucker

[57] ABSTRACT

This disclosure is directed to a method and means for compression and coldwelding of stripped ends of flat, insulated, multi-conductor cable, the conductors of which are usually, but not always, composed of stranded, soft, annealed copper. The stripped or bared ends of the resulting cable are spaced apart within very close tolerances of the order of 1/100 of an inch. These close tolerances are obtained by first stripping a small area of the cable along a designated stripping line to bare a given area of conductors, then confining the bare conductors within grooves or channels of a first metal die shoe having predetermined center-to-center spacings, and compressing the conductors under pressure exerted by means of a second metal die shoe carrying teeth interfitting into, or slidably engaging with, each of the grooves occupied by the conductors. After compression and coldwelding of the conductors this disclosure provides a simplified, and automatic, method and means of precisely cutting the compressed ends. The stripped, compressed conductor ends are then fluxed and tinned so that they are very rigidly fixed in place with respect to each other, and can be much more readily interconnected to various types of precisely spaced termination points and other electrical interconnect assemblies.

25 Claims, 6 Drawing Figures

PATENTED JUN 25 1974 3,819,104

APPARATUS FOR COMPRESSION AND COLDWELDING OF STRIPPED ENDS OF MULTI-CONDUCTOR CABLE

BRIEF SUMMARY OF THE INVENTION

This invention relates to an improved method and means for producing bared or stripped conductor ends from insulated multi-conductor cable. This invention has great importance where very close tolerances of the conductor and spacing, of the order of ± 1/100 of an inch or less, is required.

The conductors usually employed in flat round conductor, individually insulated, or in flat, multi-conductor, laminated cable, are composed of many fine strands of soft copper wire, e.g., from seven to 105 strands depending on the wire size, usage and other factors. When the ends of such multi-conductor cable are stripped, and the conductor ends thereof bared, for tinning in order to fix the ends of the conductors of such cable with respect to each other, fraying of the strands occurs and, in addition, the conductor ends still remain very flexible; and close tolerances of the spacing between conductor ends cannot be successfully achieved on a regular production basis.

I have found that extremely close tolerances of bared ends of flat multi-conductor cable can be achieved on a regular, high, production basis by utilizing the following method and means:

a. stripping a small area of the cable along a designated stripping line, to bare a given area of conductors;

b. confining each of the conductors, so bared, within grooves or channels of a first metal die having predetermined center-to-center spacings; and c. compressing each of the confined conductors by means of a second metal die shoe, carrying teeth interfitting into each of the grooves occupied by the conductors to thereby work harden (or coldweld) the strands of each of the compressed conductors. It is found that the malleable copper, or other types of electrical conductor material, is cold flowed and strengthened after the compression step.

During the compression stage, the conductors, initially round, in cross-section, have their cross-sectional shape altered to that of a square or rectangle, and present more surface area for bonding. Because the conductors are also much stronger, spacing of the conductor ends cannot be as easily altered during the later processing steps of cutting, tinning and interconnection to other assemblies.

After compression and coldwelding of the conductors this invention also provides a simplified, and automatic method and means of precisely cutting the compressed ends to expose a predetermined length of conductor. The stripped compressed conductor ends are then fluxed and tinned so that they are very rigidly fixed in place with respect to each other and can therefore be much more readily interconnected to various types of precisely spaced termination points and other electrical interconnect assemblies, because of the close tolerances produced.

BRIEF DESCRIPTION OF THE DRAWINGS

FIG. 6 is a cross-sectional view of the apparatus of my invention taken along the line 6—6 of FIG. 1.

DETAILED DESCRIPTION OF THE INVENTION

Figure 1:
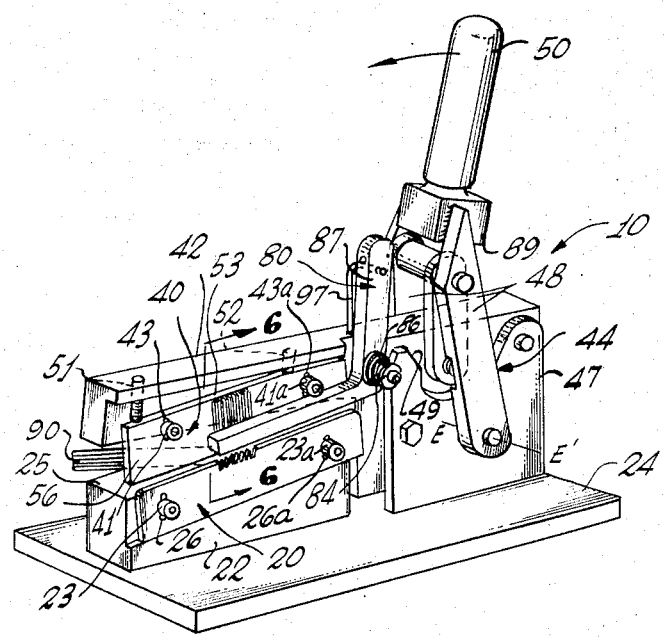
FIG. 1 is a perspective view of the apparatus of my invention for compression and coldwelding of stripped ends of multi-conductor cable, just prior to the completion of the compression stage.

The compression apparatus or unit of this invention is indicated generally by the numeral 10. With reference especially to FIG. 1, the apparatus 10 comprises, in general:

a. a stably mounted first or female die member having grooves or channel means of dimensions such that they snugly confine the individual conductors of a multi-conductor cable which are to be compressed and cut;

b. a second or male die member provided with a compression member for each of the individual conductors of the multi-conductor cable which member preferably consists of teeth or fins very closely interfitting into, or slidably engaging within, each of the channel means occupied by the individual conductors;

c. compression means for accurately reproducibly, quickly and forcibly moving the teeth of male die member into the channel means of the female die member to complete the compression stage; and d. a cutting tool for automatically and accurately cutting the individual conductors upon the completion of the compression stage.

Referring specifically again to FIG. 1, a first (female) die member 20 or die shoe, as it is also known in the trade, is stably mounted to a metal die block 22, which die block 22 is, in turn, stably mounted, as by screws (not shown) to a metal base plate 24. The die block 22 and base plate 24 are preferably made of a steel alloy as are all the other metal parts described herein.

Figure 2:
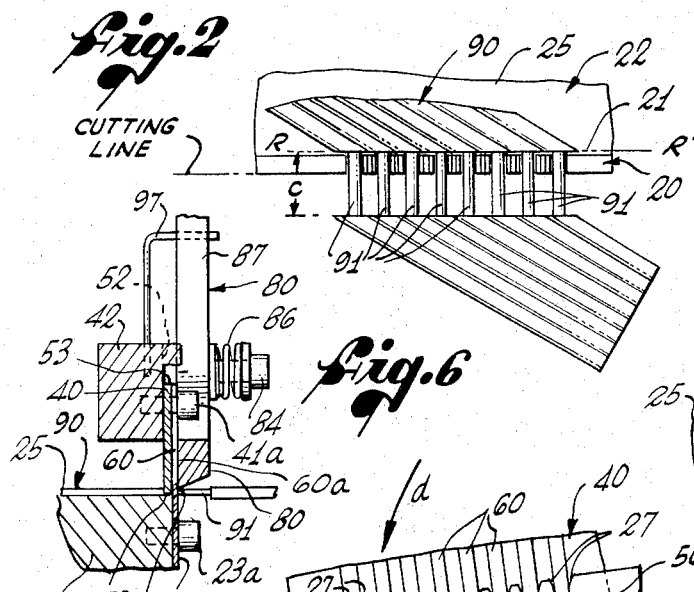
FIG. 2 is an enlarged, fragmentary, cross-sectional view taken along the line 2—2 of FIG. 1, with a portion of a multi-conductor cable shown in the apparatus.
Figure 3:
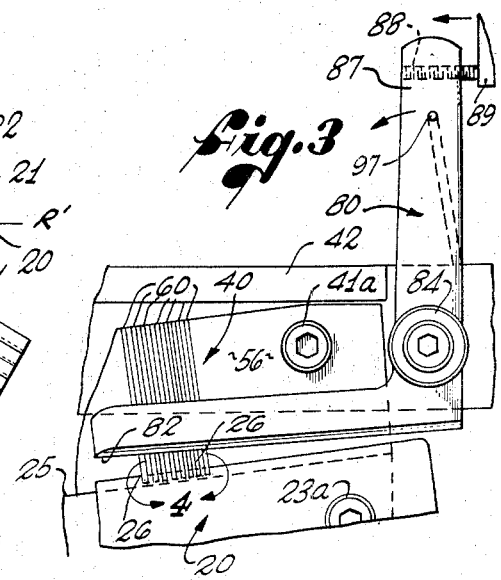
FIG. 3 is an enlarged, side elevational view of a portion of the apparatus of FIG. 1 showing the apparatus after the compression stage has been completed but before the cutting of the ends of the conductors.
Figure 4:
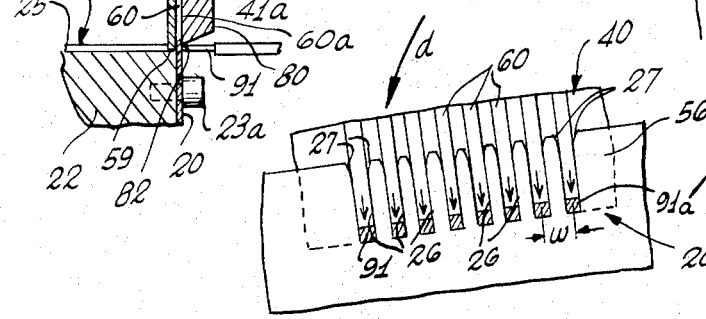
FIG. 4 is an enlargement of FIG. 3 taken along the line 4—4 of FIG. 3.
Figure 5:
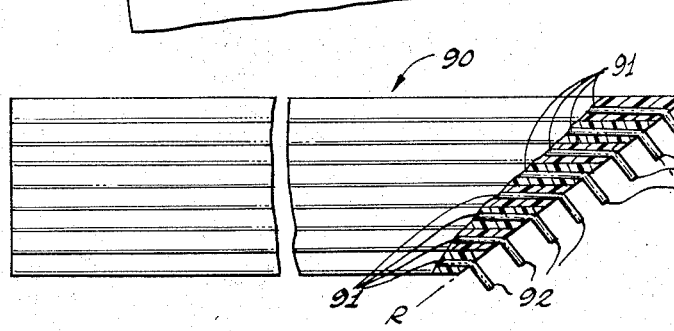
FIG. 5 is a top plan view of a multi-conductor cable, whose end has been compressed and cut in accordance with the methods and means of this invention.

The female die shoe 20, as clearly shown in FIGS. 2-4, is provided with a series of grooves 26 having a predetermined center-to-center spacing depending upon the final desired center-to-center spacing of the finally compressed ends of the individual conductors of the multi-conductor cable. The finally compressed and cut ends of the insulated multi-conductor cable are shown in FIG. 5, the cable being designated, generally, by the numeral 90, the individual conductors designated by the numeral 91, and the finally compressed and cut ends thereof are designated by the numeral 92. The center-to-center spacing between the two adjacent right hand grooves 26 is designated by w, thereby resulting in a distance w between the two adjacent right hand conductors of w, in cable 90. It will be understood that the center-to-center spacing between other adjacent grooves can be the same as or different than the distance w, depending upon the conductor size (which can vary within a single cable) and the other requirements of the subsequent interconnections for the cable 90.

The grooves 26 have a depth substantially greater than the undeformed diameter of the individual conductors 91, as shown in FIG. 4, and preferably, the width of the grooves 26 are substantially equal to, or slightly less than, the undeformed diameter of the individual conductors. In this way, the bared conductors 91 can be fitted snugly within the grooves 26 of the die shoe 20 prior to the compression thereof.

Prior to placement of the conductors 91 into die shoe 20, they must be bared or stripped. The stripping of the insulation from cable 90, along a precise reference line, can be accomplished in a number of ways. The method and means presently preferred is shown and described in the copending patent application of Roger J. Lang, Ser. No. 326,285, filed concurrently herewith (and bearing Docket No. 262 of the law offices of I. Morley Drucker) and entitled "JIG APPARATUS FOR USE IN STRIPPING INSULATION FROM MULTI-CONDUCTOR CABLE" which application is commonly assigned to the assignee of the instant application. The multi-conductor cable usable herein may be flat, round conductor, multi-conductor cable of the type described in U.S. Pat. No. 3,005,739, laminated flat multi-conductor cable as described, for example, in U.S. Pat. No. 3,082,292 or any other cable having conductors aligned in generally parallel relationship.

After the cable 90 is stripped, along a reference line, R-R', and over a given width, c, (see FIG. 2), the conductors 91 are quite flexible and can readily be manually placed into appropriately sized grooves 26 of die shoe 20. To facilitate entry of the conductors 91 into the grooves 26, the entrances 27 of the grooves are flared or enlarged.

Die shoe 20 is removably mounted to the side of die block 22 by means of screws 23, 23a, so that the bottom of grooves 26 preferably lie just above the top surface 25 of die block 22. In this way, that portion of cable 90 immediately adjacent reference line R-R', can be on the top surface 25 with its conductors 91, in grooves 26, lying in substantially the same plane as the cable 90 and reference line R-R' abuts the vertical side 21 of die shoe 20. (See FIG. 6).

Screws 23, 23a ride within elongated or enlarged adjusting slots 26, 26a to enable the exact desired placement of die shoe 20, with reference to die block 22, and also enables exact juxtaposition of die shoe 20 to be made with a male die member or shoe 40, during the compression stage. Since screws 23, 23a removably mount die shoe 20 to die block 22, other die shoes can be readily utilized, with my apparatus, for other conductor configurations.

The second (male) die member 40 is removably mounted to the side of an arcuately movable arm member 42, by conventional headed screws 41, 44a, the arm 42 being hingedly mounted to a compression means which comprises a metal toggle joint 44 of the type described and shown in U.S. Pat. No. 3,149,832, and manufactured by DE-STA-CO of Detroit, Mich. The toggle joint 44 is hingedly mounted to bracket 47, the bracket 47, in turn being fixedly mounted to base plate 24. The toggle joint 44 is moved in the direction shown by the arrow by an actuating means, such as handle 50.

While the particular arcuate motion provided by the compression means 44 is presently preferred, it is to be understood that other means of movement for the arm member 42 (and die shoe 40 carried thereby) such as pure linear or pure circular motion, may also be utilized. The only limitation on such movement is that accurate and reproducible engagement of the die shoes 20, 40 shall be provided for the purposes of this invention.

The motion of arm 42 provided by toggle joint 44 is that of an ever-decreasing arc, with respect to the axis of rotation E–E'. As the arm member 42 and die shoe 40 reaches die shoe 20, essentially linear motion, in the direction d (which direction d, lies in common with the longitudinal axis of the grooves 26) is achieved.

The metal die shoe 40 is provided with a plurality of teeth 60 integrally formed thereon. The teeth 60 are formed on the exposed vertical face 56 of the die shoe 40 and are each of a dimension such that they closely interfit within, or slidably engage with, grooves 26 of die shoe 20, (as best seen in FIG. 4) during the compression stage. The center-to-center spacing between teeth 60 and grooves 26 is thus the same, within very close tolerances of the order of 1/1000 of an inch.

In the operation of the apparatus 10, the cable 90 is first stripped along reference line R-R', and for a distance c, as earlier described, and placed within die shoe 20 so that the conductors 91 lie at or near the bottom of the grooves 26, and the reference line R-R' abuts the vertical surface 21 of die shoe 20. The cable 90, to the left of the stripped area, lies flat on the face 25 of die block 22. As the handle 50 of the compression means 44 is moved, counterclockwise, in the direction of the arrow, the compression arm 42, carrying die shoe 40, moves arcuately and then linearly in the direction d (FIG. 4) until the teeth 60 of die shoe 40 slidably interfit, or engage, within grooves 26 greatly compressing conductors 91 under the mechanical advantage supplied by the compression mechanism of toggle joint 44. The bottom edge 59 of die shoe 40 lies just above the top face 25 of die block 22, as the teeth 60 reach the bottom of their travel within the grooves 26. (See FIG. 6).

As earlier described, the conductors 91, are initially round before compression, but due to the heavy force applied by the teeth 60 within the confined area provided by the grooves 26, the conductor shape is altered to that of a square or rectangular form as indicated by the numeral 91a in FIG. 4. Furthermore, the conductors 91, being usually made of multiple strands of softer metal (such as copper or nickel) than the die shoes 20 and 40, will work harden and the strands will lock together, and become much more rigid and fixed in position, than prior to the compression stage.

Screws 41, 41a, which mount male die member 40 to arm 42, ride within elongated or enlarged adjusting slots 43, 43a, respectively, to enable exact placement of die shoe 40 with reference to die shoe 20 during the compression stage. Screws 41, 41a need only be slightly loosened and die shoe can thereby be moved, in order to make any fine adjustments. Such fine adjustments of the angularity of die shoe 40 are retained during the compression stage by tightening adjustment screws 51, 52, provided in arm 42, so that they both abut the upper edge 53 of die shoe 40. Thus, as impact is made between die shoes 20 and 40, during the compression stage, die shoe 40 will not ride upwardly, under the impact, because of the downward force exerted by screws 51, 52 on the die shoe 40.

In regular production, the teeth 60 and grooves 26 of the die shoes 40 and 20, respectively, will wear and the easy, fine, adjustments made possible by the apparatus of this invention, to compensate for such wear, become exceedingly important. Furthermore, die shoe 40 can be readily replaced with new die shoes, or with die shoes of another configuration, because of the readily removable nature of the attachment of die shoe 40 by conventional headed screws 41, 41a.

As soon as the compression stage of the operation is completed, the cutting of the ends of the conductors 91 is automatically commenced. This is accomplished in the following manner. A cutting tool 80, having a lower cutting edge 82, and an upper extension means or arm 87, is pivotally mounted to compression arm 42 by means of a large-headed screw or bolt 84. The head of the bolt 84 retains a conventional coil-type compression spring 86 between the bolt 84 and the side of the cutting tool (seen best in FIG. 1) which spring 86 forcibly urges the cutting tool edge 82 into abutment with the projecting sides 60a of teeth 60 (see FIG. 6).

The extension arm 87 of cutting tool 80 has a small adjustable projecting screw 88 mounted therein. The screw 88 is adjusted to a length such that it is engaged by the head 89 of the handle 50 of the toggle joint 44 immediately after the teeth 60 and grooves 26 have been fully engaged and the compression stage has been completed. At that point, in the operation, the handle 50 and head 89 attached thereto of the toggle joint 44 is moved further (to the left in FIG. 1) to thereby pivotally move the extension arm 87 of cutting tool 80, about screw or bolt 84, causing cutting edge 82 to pivot downwardly through the precise cutting line shown in FIG. 2, which cutting line lies immediately adjacent teeth 60. In this manner, the tolerances of the cut ends 92 of the conductors 91 are held to within ± 15/1000 of an inch, or less, on a regular production basis. Also, the distance w between bared conductors is held to tolerances of the order of ± 1/100 of an inch and less on a regular production basis.

The cutting tool 80 is moved to the cutting position (shown in FIG. 6) only under the influence of the engagement of head 89 of the toggle joint 44 with the extension arm 87 of the cutting tool. The extent of pivotal movement of the cutting tool 80 past the cutting position is automatically limited by the engagement of the short toggle arms 48 of toggle joint 44 with shoulders 49 of the bracket 47 to which the toggle joint 44 is mounted. The handle 50 is then moved rearwardly (to the right in FIG. 1) by the user of the apparatus 10, thereby removing head 89 from engagement with extension arm 87 and adjustment screw 88.

A spring means, in the form of a spring steel rod 97, is removably secured between the upper end 87 of the cutting tool 82 and the arm 42. As soon as pressure on the handle 50 is released, thereby removing head 89 from adjustment screw 88 (i.e., after the cutting operation) the cutting tool 82 is urged by the spring 97 back to its initial or rest position, above the cutting line, as shown in FIG. 1, in which position it is ready for the next cutting operation.

As earlier mentioned, the conductor ends 92 are then fluxed and tinned, or otherwise treated, for their final finishing.

Modifications of the preferred embodiment described herein may be employed which will be obvious to those skilled in the art. For example, various types of compression means may be utilized, and other forms of die shoes. For these reasons, I intend to be bound only by the claims which follow.

I claim:

1. An apparatus for the simultaneous compression of a plurality of stripped conductors aligned in generally parallel relationship, which comprises:

a female die member having a plurality of grooves formed therein, each of said grooves having a predetermined spacing with respect to each other and having dimensions such that the walls of each of said grooves confine each of said stripped conductors to be compressed, when said stripped conductors to be compressed are viewed in cross-section;

a male die member having a plurality of teeth affixed thereto, said teeth having a predetermined spacing and dimensions corresponding to that of said grooves whereby each of said teeth is adapted to substantially interfit within each of said grooves of said female die member; and compression means for forcibly moving the teeth of said male die member, along a fixed path relative to said female die member, and into the grooves of said female die member whereby to compress stripped conductors confined within said grooves.

2. The apparatus of claim 1 which includes means for finely adjusting the position of said female die member relative to said male die member whereby to obtain accurate, interfitting of said teeth within said grooves.

3. The apparatus of claim 1 which includes means for finely adjusting the position of said male die member, relative to said female die member whereby to obtain accurate interfitting of said teeth within said grooves.

4. The apparatus of claim 1 wherein each of said grooves have entrances which are enlarged for easy entry of said teeth.

5. The apparatus of claim 1 which includes a die block having a top surface, said female die member being stably mounted to said die block so that the bottom of said grooves lie substantially flush with said top surface of said die block.

6. The apparatus of claim 1 wherein said compression means includes: an arm member; means for attaching said male die member to said arm member;

a first adjustment means for finely adjusting the position of said male die member relative to said female die member whereby to obtain accurate interfitting of said teeth with said grooves; and a motion limiting means attached to said arm member and abutting said male die member preventing upward movement of said male die member as said teeth of said male die member interfit within the grooves of said female die member.

7. The apparatus of claim 6 which includes a second adjustment means for said motion limiting means.

8. The apparatus of claim 6 wherein said second adjustment means comprises a pair of adjustment screws.

9. The apparatus of claim 1 wherein said compression means includes an arm member, said male die member being removably attached to said arm member, and actuating means for moving said arm member and said attached male die member into engagement with said female die member.

10. The apparatus of claim 1 which includes: a cutting tool movably mounted adjacent the teeth of said male die member; and extension means on said cutting tool, said compression means engaging said extension means, and causing movement of said cutting tool from a rest position to a cutting position immediately after said teeth of said male die member have moved into said grooves of said female die member and compressed said stripped conductors confined within said grooves.

11. The apparatus of claim 10 wherein said extension means is finely adjustable with respect to said compression means.

12. The apparatus of claim 10 which includes a first spring means urging said cutting tool to a position immediately adjacent the teeth of said male die member.

13. The apparatus of claim 10 which includes a spring means urging said cutting tool to said rest position remote from said cutting position.

14. The apparatus of claim 5 which includes means for removably mounting said female die member to said die block.

15. The apparatus of claim 6 wherein said means for attaching said male die means to said arm member is readily removable.

16. An apparatus for the simultaneous compression of a plurality of stripped conductors aligned in generally parallel relationship, which comprises:

a female die member having a plurality of grooves formed therein, each of said grooves having a predetermined spacing with respect to each other and having dimensions such that the walls of each of said grooves confine each of said stripped conductors to be compressed, when said stripped conductors to be compressed are viewed in cross-section;

a die block having a top surface, said female die member being stably mounted to said die block so that the bottom of said grooves lie approximately level with said top surface of said die block;

an arm member mounted for movement along a fixed path;

a male die member having a plurality of teeth affixed thereto, said teeth having a predetermined spacing and dimensions corresponding to that of said grooves whereby each of said teeth is adapted to substantially interfit within each of said grooves of said female die member;

means for attaching said male die member to said arm member; and means for moving said arm member towards said female die member along said fixed path whereby said teeth of said male die member are forcibly moved into the grooves of said female die member to compress stripped conductors confined within said grooves.

17. The apparatus of claim 1 which includes means for finely adjusting the position of said female die member relative to said male die member whereby to obtain slidable engagement of said teeth within said grooves.

18. The apparatus of claim 16 which includes means for finely adjusting the position of said male die member, relative to said female die member whereby to obtain slidable engagement of said teeth within said grooves.

19. The apparatus of claim 16 which includes a first adjustment means for finely adjusting the position of said male die member relative to said female die member whereby to facilitate slidable engagement of said teeth within said grooves.

20. The apparatus of claim 19 which includes a motion limiting means attached to said arm member and abutting said male die member preventing upward movement of said male die member as said teeth of said male die member slidably engages within the grooves of said female die member.

21. The apparatus of claim 20 which includes a second adjustment means for said motion limiting means.

22. The apparatus of claim 16 which includes: a cutting tool movably mounted adjacent the teeth of said male die member; and extension means on said cutting tool, said compression means engaging said extension means and causing movement of said cutting tool from a rest position to a cutting position immediately after said teeth of said male die member have moved into said grooves of said female die member and compressed said stripped conductors confined within said grooves.

23. The apparatus of claim 22 wherein said extension means is finely adjustable with respect to said compression means.

24. The apparatus of claim 22 which includes a first spring means urging said cutting tool to a position immediately adjacent the teeth of said male die member.

25. The apparatus of claim 22 which includes a spring means urging said cutting tool to said rest position remote from said cutting position.

* * * * *